United States Patent [19]

Saito et al.

[11] Patent Number: 5,167,169
[45] Date of Patent: Dec. 1, 1992

[54] CONTROL SYSTEM OF AN AUTOMATIC TRANSMISSION FOR AN ALCOHOL ENGINE

[75] Inventors: Yoichi Saito; Takamitsu Kashima; Masaru Kurihara, all of Tokyo, Japan

[73] Assignee: Fuji Jukogyo Kabushiki Kaisha, Tokyo, Japan

[21] Appl. No.: 756,173

[22] Filed: Sep. 6, 1991

[30] Foreign Application Priority Data

Sep. 28, 1990 [JP] Japan .................. 2-259895

[51] Int. Cl.$^5$ .......................... B60K 41/06
[52] U.S. Cl. ........................ 74/861; 74/866; 192/3.31
[58] Field of Search ............ 74/861, 866, 882, 890; 192/0.076, 0.092, 3.29, 3.31

[56] References Cited

U.S. PATENT DOCUMENTS

| | | |
|---|---|---|
| 4,385,531 | 5/1983 | Kobayashi et al. ............ 74/882 X |
| 4,585,101 | 4/1986 | Danno ........................... 74/890 X |
| 4,618,041 | 10/1986 | Sotoyama et al. ............. 74/890 X |
| 4,677,878 | 7/1987 | Yamamori et al. ............ 74/861 |
| 4,768,632 | 9/1988 | Moan ........................ 74/3.29 X |
| 4,843,916 | 7/1989 | Bouta .......................... 74/890 X |
| 5,050,717 | 9/1991 | Shibayama ................ 74/3.31 X |
| 5,088,350 | 2/1992 | Kurihara et al. ............. 74/861 |

FOREIGN PATENT DOCUMENTS 2625770 12/1977 Fed. Rep. of Germany ........ 74/861
3-219163 9/1991 Japan .

Primary Examiner—Leslie A. Braun
Assistant Examiner—Khoi Q. Ta
Attorney, Agent, or Firm—Martin A. Farber

[57] ABSTRACT

An automatic transmission has a lockup clutch for a torque converter. Concentration of alcohol is detected by an alcohol concentration sensor. The lockup clutch is engaged at a lower vehicle speed when the alcohol concentration detected by the alcohol concentration sensor is higher than a predetermined reference value.

7 Claims, 14 Drawing Sheets

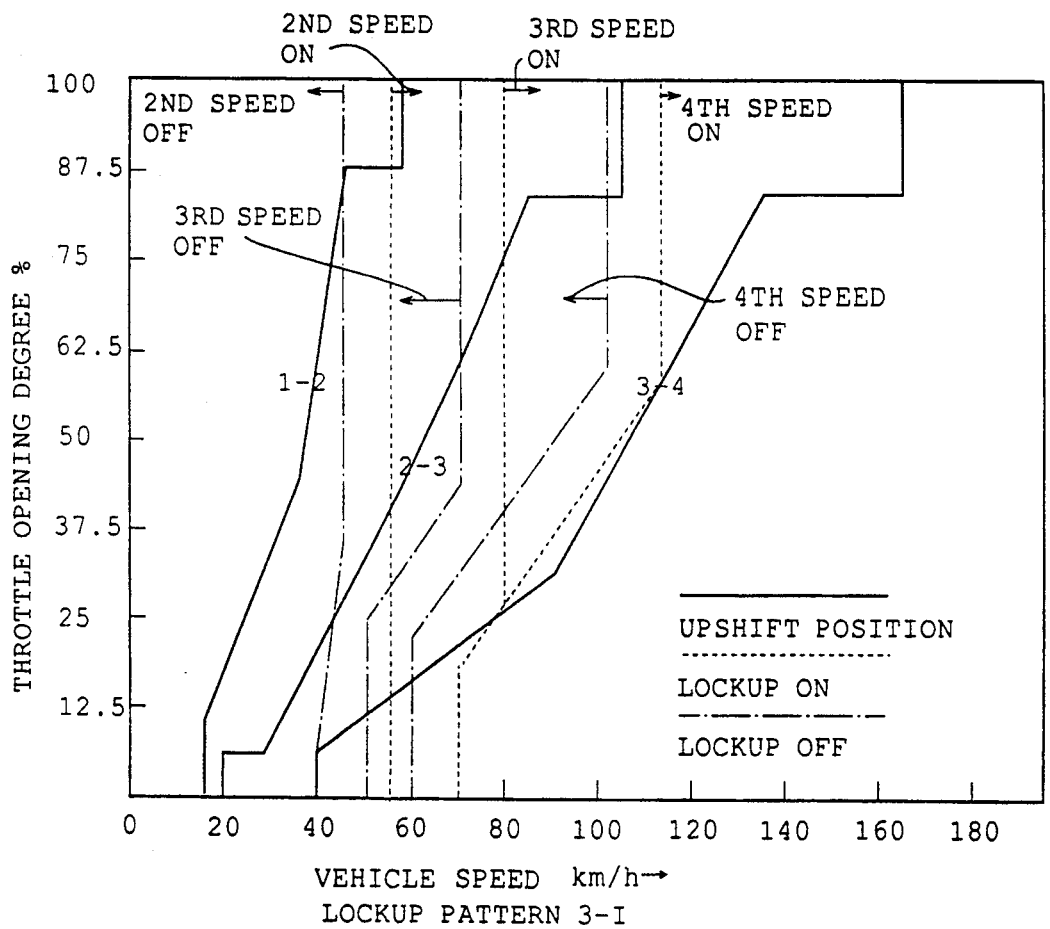

LOCKUP PATTERN 5-I

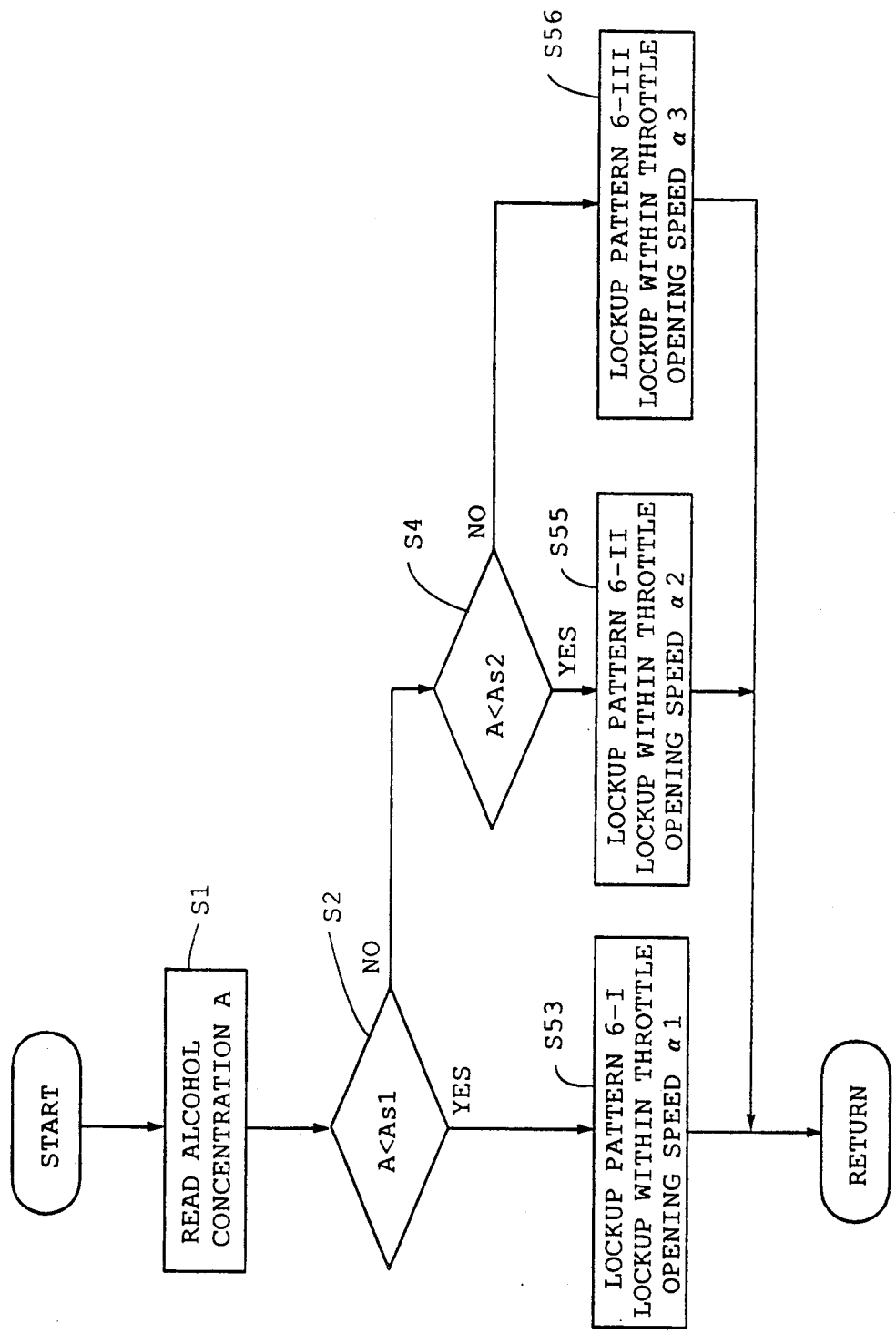

CONTROL SYSTEM OF AN AUTOMATIC TRANSMISSION FOR AN ALCOHOL ENGINE

BACKGROUND OF THE INVENTION

The present invention relates to a control system of an automatic transmission having a torque converter for a motor vehicle driven by an alcohol engine using a mixed fuel of alcohol and gasoline (flexible fuel vehicle), and more particularly to the control system for controlling a lockup system of the torque converter in dependency on concentration of the alcohol in the fuel.

In the alcohol engine which is controlled in maximum efficiency, the calorific value of the alcohol is slightly larger than that of the gasoline in a theoretical air fuel ratio and the flaming speed of the alcohol is higher than the flaming speed of the gasoline. Consequently, as the concentration of the alcohol in the fuel increases, the ignition timing of the engine approaches a top dead center so that thermal efficiency is increased, thereby increasing engine power.

However, since engine performance changes in accordance with change of the alcohol concentration, a driver feels uncomfortable when the alcohol concentration changes.

Fuel consumption of the alcohol engine is larger than that of the gasoline engine.

SUMMARY OF THE INVENTION

An object of the present invention is to provide a control system of an automatic transmission for an alcohol engine in which a preferable lockup pattern is determined in dependency on concentration of alcohol, thereby improving fuel consumption and driveability of a motor vehicle.

The other objects and features of this invention will become understood from the following description with reference to the accompanying drawings.

BRIEF DESCRIPTION OF DRAWINGS

FIG. 11 is a flowchart showing a sixth embodiment of another operation of the control unit.

DETAILED DESCRIPTION OF THE PREFERRED EMBODIMENTS

Figure 1:
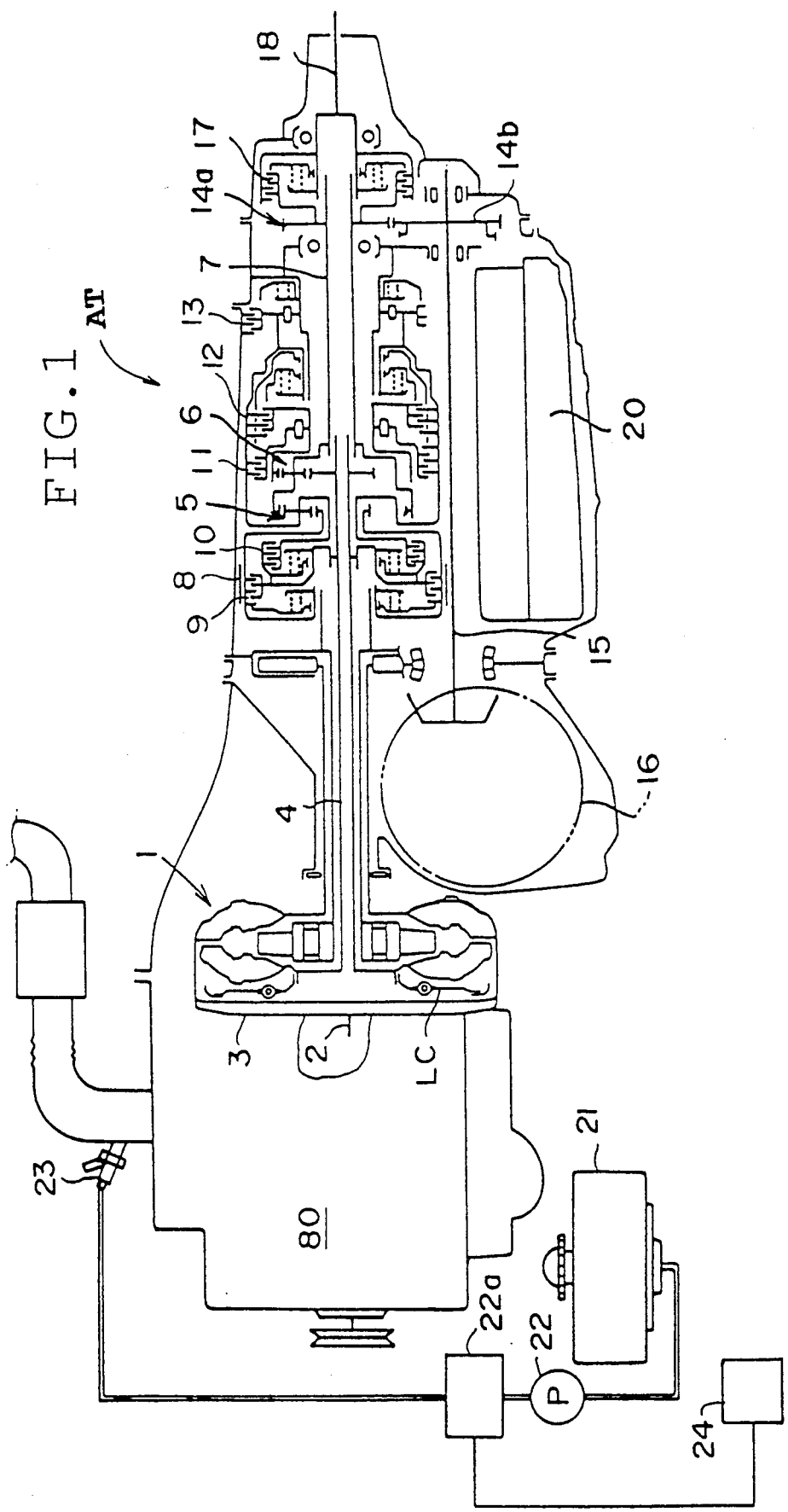
FIG. 1 is a schematic diagram showing a power transmission system for an automatic transmission according to the present invention.

Referring to FIG. 1, an internal combustion engine 80 is mounted on a front portion of a motor vehicle. A crankshaft 2 of the engine 80 is operatively connected to a torque converter 1 of an automatic transmission AT through a drive plate 3 of the torque converter 1. The torque converter 1 is provided with a lockup clutch LC. An input shaft 4 extends from a turbine of the torque converter 1 to the automatic transmission AT. The output of the automatic transmission AT is transmitted to a reduction drive shaft 7 which is aligned with the input shaft 4 through a front planetary gear 5 and a rear planetary gear 6 of the transmission AT. In order to select an operative range and to control the operative range of the transmission AT, a brake band 8, a reverse clutch 9, a high clutch 10, a forward clutch 11, an overrunning clutch 12 and a low and reverse brake 13 are provided. The reduction drive shaft 7 is connected to a front drive shaft 15 which is disposed in parallel under the automatic transmission AT through a reduction drive gear 14a mounted on the shaft 7 and a reduction driven gear 14b. The front drive shaft 15 is connected to a final reduction device 16 for front wheels of the vehicle. The reduction drive shaft 7 is connected to a rear drive shaft 18 through a transfer clutch 17, for rearwardly transmitting the torque. A hydraulic control device 20 is provided for controlling the torque converter 1, the clutches 9, 12 and 17, and the brake 13 of the transmission AT. Fuel is supplied from a fuel tank 21 to a fuel injector 23 of the engine 80 through a fuel pump 22. An alcohol concentration sensor 24 is provided for sensing the concentration of the alcohol in the fuel via a pressure regulator 22a for regulating fuel pressure.

Figure 2:
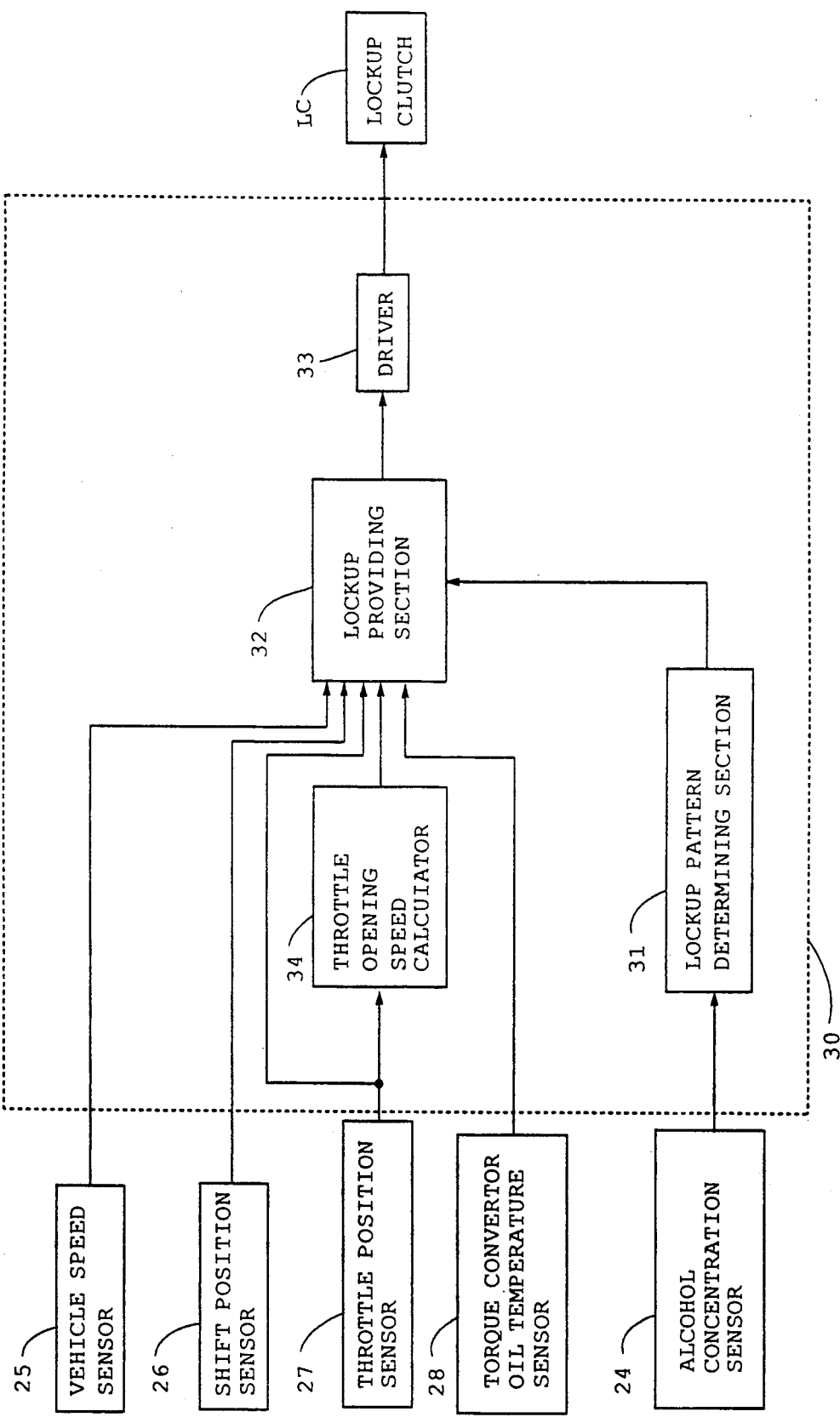
FIG. 2 is a block diagram showing a control unit for a lockup system of a torque converter of the system.

Referring to FIG. 2, a control unit 30 is provided for controlling the lockup clutch LC for the torque converter 1. The control unit 30 is applied with signals from sensors such as a vehicle speed sensor 25, a shift position sensor 26, a throttle position sensor 27 and the alcohol concentration sensor 24. The control unit 30 is provided with a lockup pattern determining section 31 which is applied with alcohol concentration A from the alcohol concentration sensor 24. The lockup pattern determining section 31 compares the alcohol concentration A with a predetermined set value and selects an optimum lockup pattern in accordance with the comparison of the alcohol concentration. The section 31 produces a selected lockup pattern signal which is applied to a lockup providing section 32. The lockup providing section 32 is also applied with a vehicle speed signal from the vehicle speed sensor 25, a throttle opening degree signal from the throttle position sensor 27, and a shift range signal from the shift position sensor 26. The lockup providing section 32 determines whether the torque converter 1 is locked up or not in accordance with parameters of the engine operating conditions such as the vehicle speed, throttle valve opening degree, and shift range and the selected lockup pattern, and produces a control signal to lockup the torque converter. The control signal is applied to a driver 33 for driving the lockup clutch LC.

The operation for selecting the lockup pattern in the lockup pattern determining section 31 will be described with reference to FIG. 3. In this embodiment, the lockup pattern is determined in accordance with the vehicle speed.

At a step S1, the alcohol concentration A detected by the alcohol concentration sensor 24 is read. At a step S2, the alcohol concentration A is compared with a first set value As1 and it is determined whether the concentration A is lower than the first set value As1 or not (A<As1).

When A<As1, namely, the alcohol concentration A is low, a lockup pattern (I) is selected at a step S3. In the pattern (I), the torque converter is locked up at 60 km/h or more. When A>As1 at step S2, the program goes to a step S4 wherein the alcohol concentration A is compared with a second set value As2 which is larger than the first set value As1. When A<As2, namely, the alcohol concentration A is at middle values, a lockup pattern (II) is selected at a step S5, wherein the torque converter is locked up at 55 km/h or more.

When A>As2 at the step S4, namely the alcohol concentration A is high, a lockup pattern (III) is selected at a step S6, wherein the torque converter 1 is locked up at 50 km/h or more.

In the control unit 30, the lockup pattern I, II or III determined in the lockup pattern determining section 31 is applied to the lockup providing section 32. The section 32 determines the control signal in accordance with the actual vehicle speed of the vehicle speed sensor 25. For example, if the lockup pattern III is selected, the section 32 provides the control signal to lock up the torque converter 1 when the vehicle speed exceeds 50 km/h.

The control unit 30 is further provided with a throttle opening speed calculator 34 and a torque converter oil temperature sensor 28. The calculator 34 is applied with the throttle valve opening degree signal from the throttle position sensor 27 and calculates throttle opening speed based on the signal. A throttle opening speed signal and an oil temperature signal are applied to the lockup providing section 32.

Figure 4:
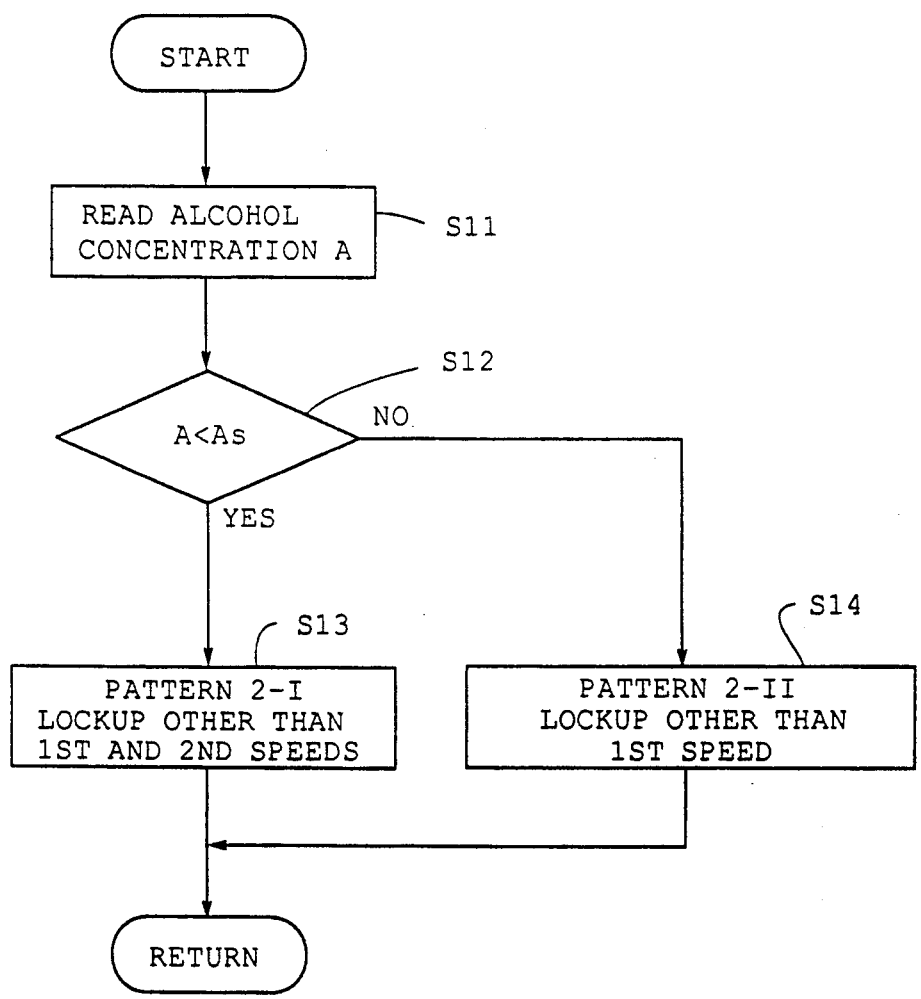
FIG. 4 is a flowchart showing a second embodiment of another operation of the control unit.

FIG. 4 shows a flowchart of the second embodiment.

At a step S11, the alcohol concentration A detected by the alcohol concentration sensor 24 is read. At a step S12, the alcohol concentration A is compared with a set value AS and it is determined whether the concentration A is lower than the set value AS or not (A<AS).

When A<AS, a lockup pattern 2-I is selected at a step S13, in which the torque converter 1 is locked up at gear ratios other than first and second speeds. The lockup system is controlled in accordance with the pattern 2-I. When A>AS, a lockup pattern 2-II is selected at a step S14, in which the torque converter 1 is locked up at gear ratios other than the first speed, for controlling the lockup clutch LC in accordance with the pattern 2-II.

Figure 5:
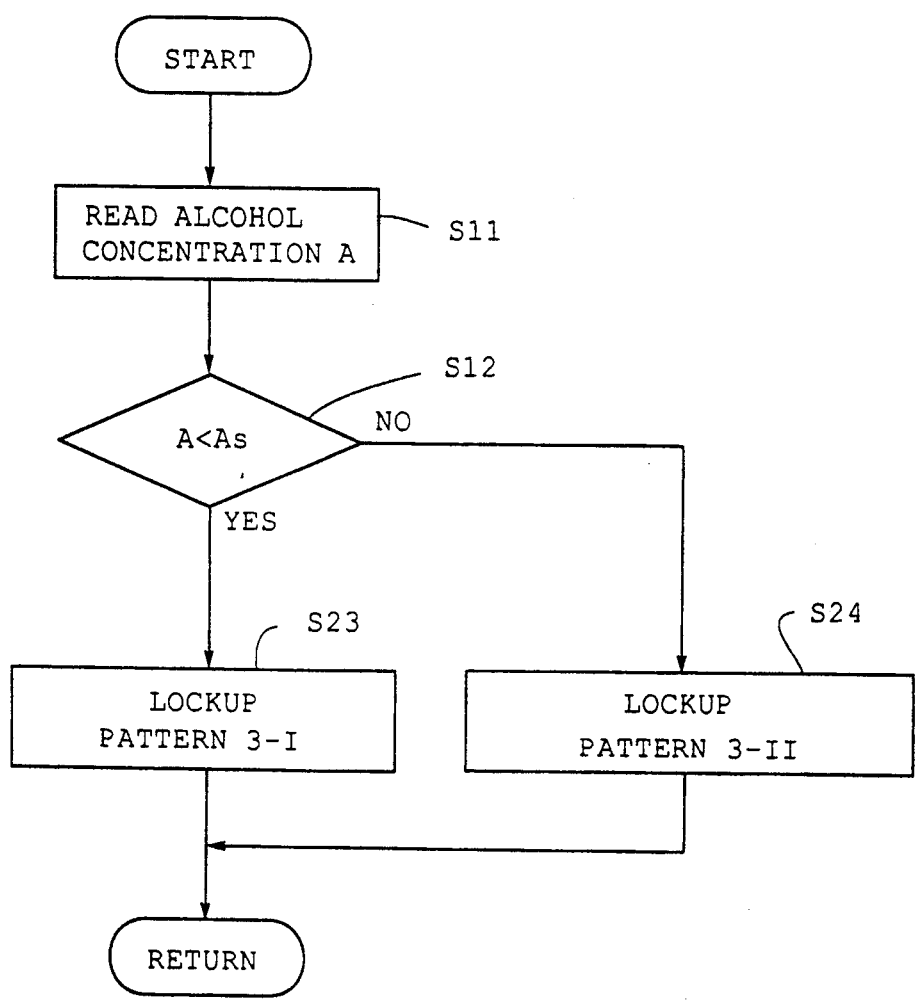
FIG. 5 is a flowchart showing a third embodiment of another operation of the control unit.
Figure 6:
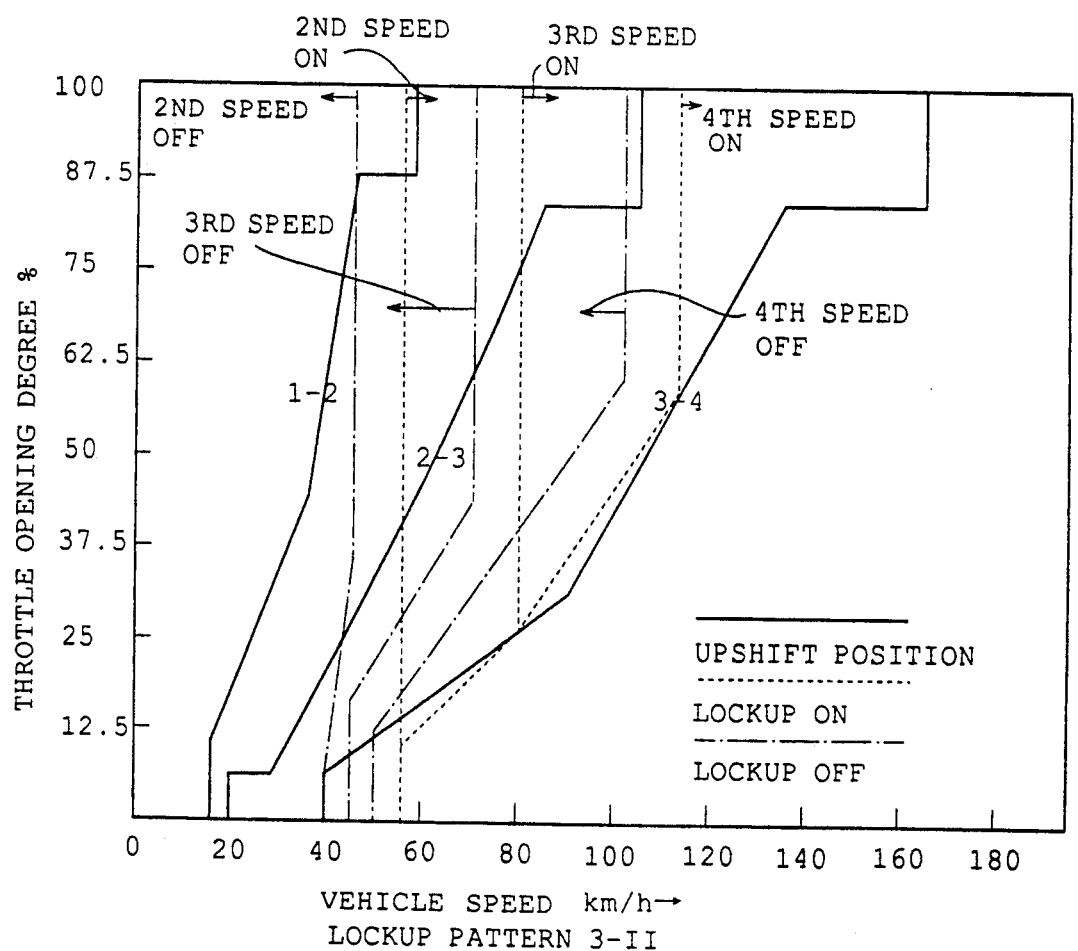
FIGS. 6a and 6b are graphs showing lockup patterns of the third embodiment for controlling the lockup system.

FIG. 5 is a flowchart showing an operation of the third embodiment. Similar to the second embodiment of FIG. 4, the alcohol concentration A is read at the step S11 and compared with the set value AS at the step S12. When A<AS, a lockup pattern 3-I shown in FIG. 6a is selected at a step S23. When A>AS, a lockup pattern 3-II shown in FIG. 6b is selected at a step S24.

In FIGS. 6a and 6b, a solid line represents an upshift position of the transmission, a dotted line represents the starting of a lockup operation, and dotted-dashed line represents the releasing of the lockup clutch. The lockup patterns 3-I and 3-II are determined in accordance with the vehicle speed. When the lockup pattern 3-I is selected at a low alcohol concentration, the lockup operation at the second speed is performed when the vehicle speed exceeds 55 km/h, and the lockup operations at third and fourth speeds are performed when the vehicle speed exceeds 70 km/h. When the lockup pattern 3-II is selected at a high alcohol concentration, the lockup operation at the second speed as well as the third and fourth speeds is performed at 55 km/h or more vehicle speed. Thus, at the high alcohol concentration, the torque converter 1 is locked up while the vehicle speed is low.

Figure 7:
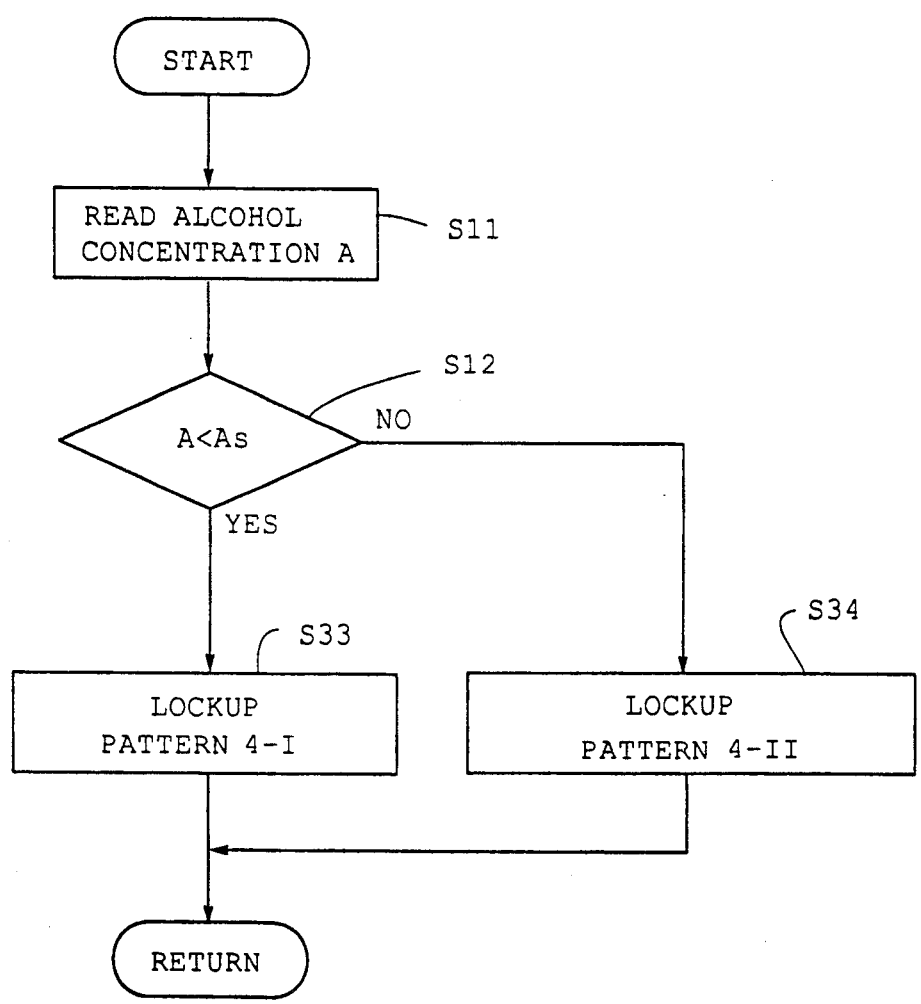
FIG. 7 is a flowchart showing a fourth embodiment of another operation of the control unit.
Figure 8:
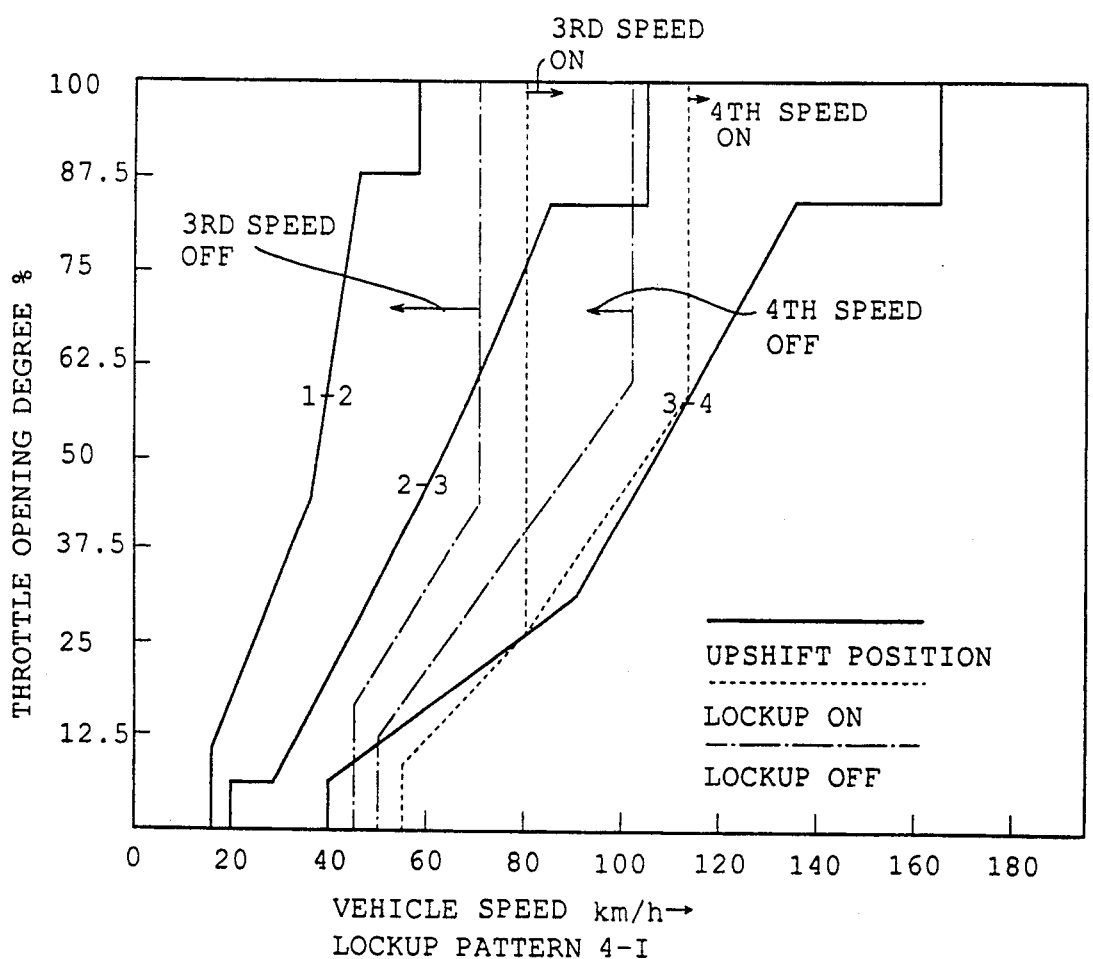
FIGS. 8a and 8b are graphs showing the lockup patterns of the fourth embodiment.
Figure 8:
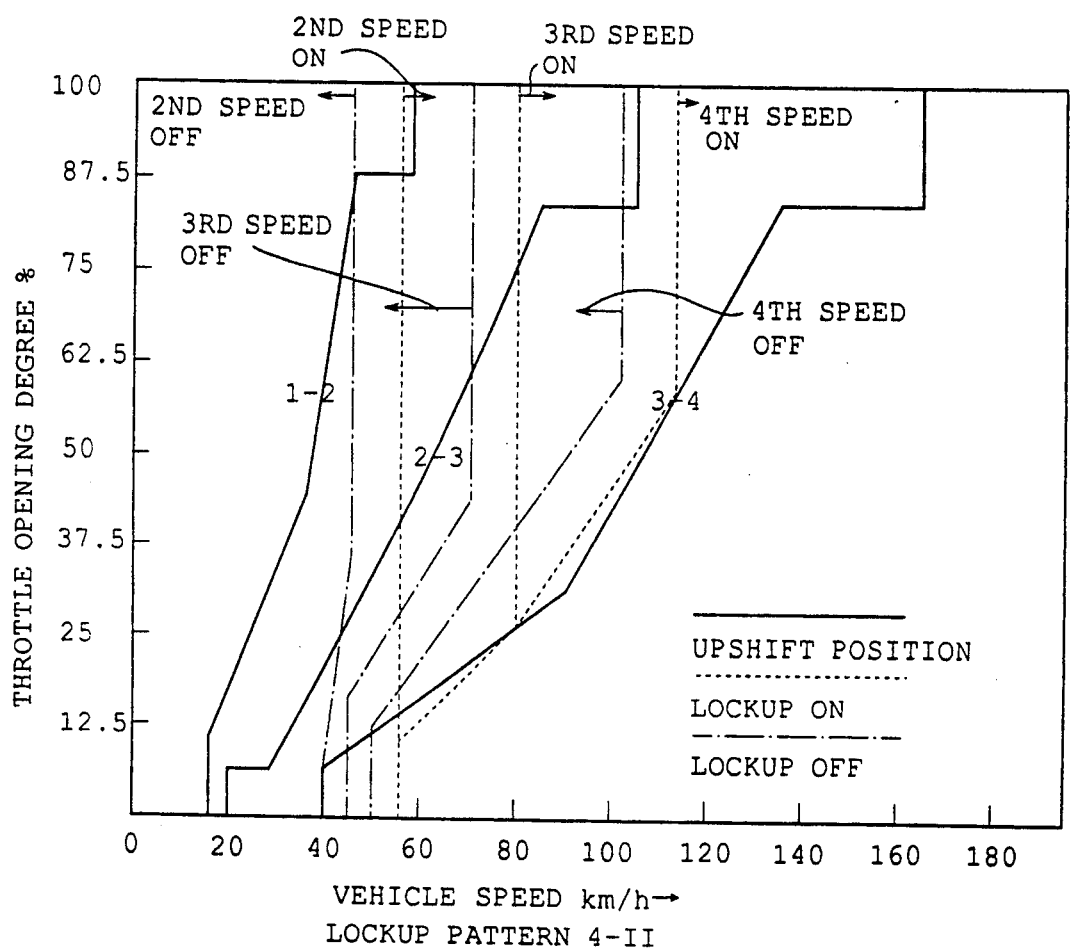

When the lockup pattern 3-I or 3-II is selected in the lockup pattern determining section 31, the lockup providing section 32 determines the control signal in accordance with output signals from the sensors 25, 26 and 27. Referring to FIGS. 7, 8a and 8b showing the fourth embodiment, a lockup pattern of a fourth embodiment is determined based on the gear ratio.

When the alcohol concentration A is lower than the set value As at step 12, a lockup pattern 4-I shown in FIG. 8a is selected at a step S33. When the alcohol concentration A is higher than the set value AS, a lockup pattern 4-II shown in FIG. 8b is selected at a step S34. When the lockup pattern 4-I is selected, the lockup clutch is operated at the third and fourth speeds at 55 km/h or more. When the lockup pattern 4-II is selected, the lockup clutch LC is operated at the second, third and fourth speeds at 55 km/h or more.

Figure 9:
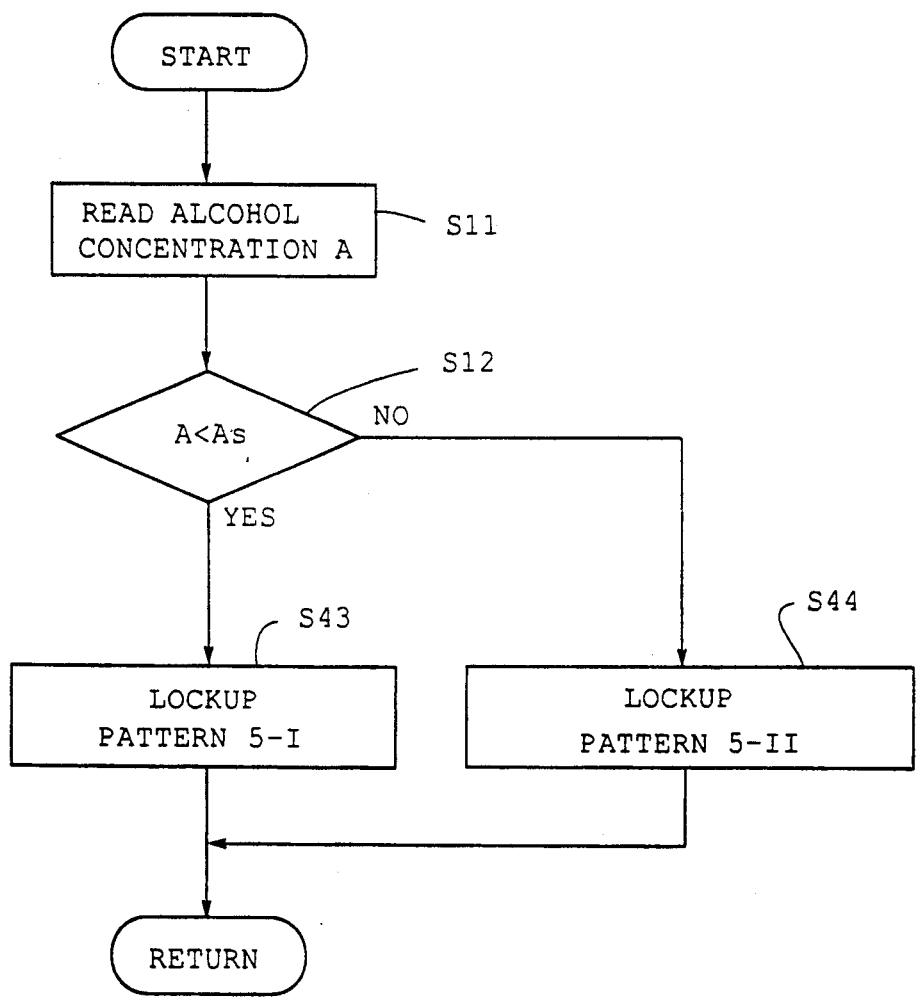
FIG. 9 is a flowchart showing a fifth embodiment of another operation of the control unit.
Figure 10:
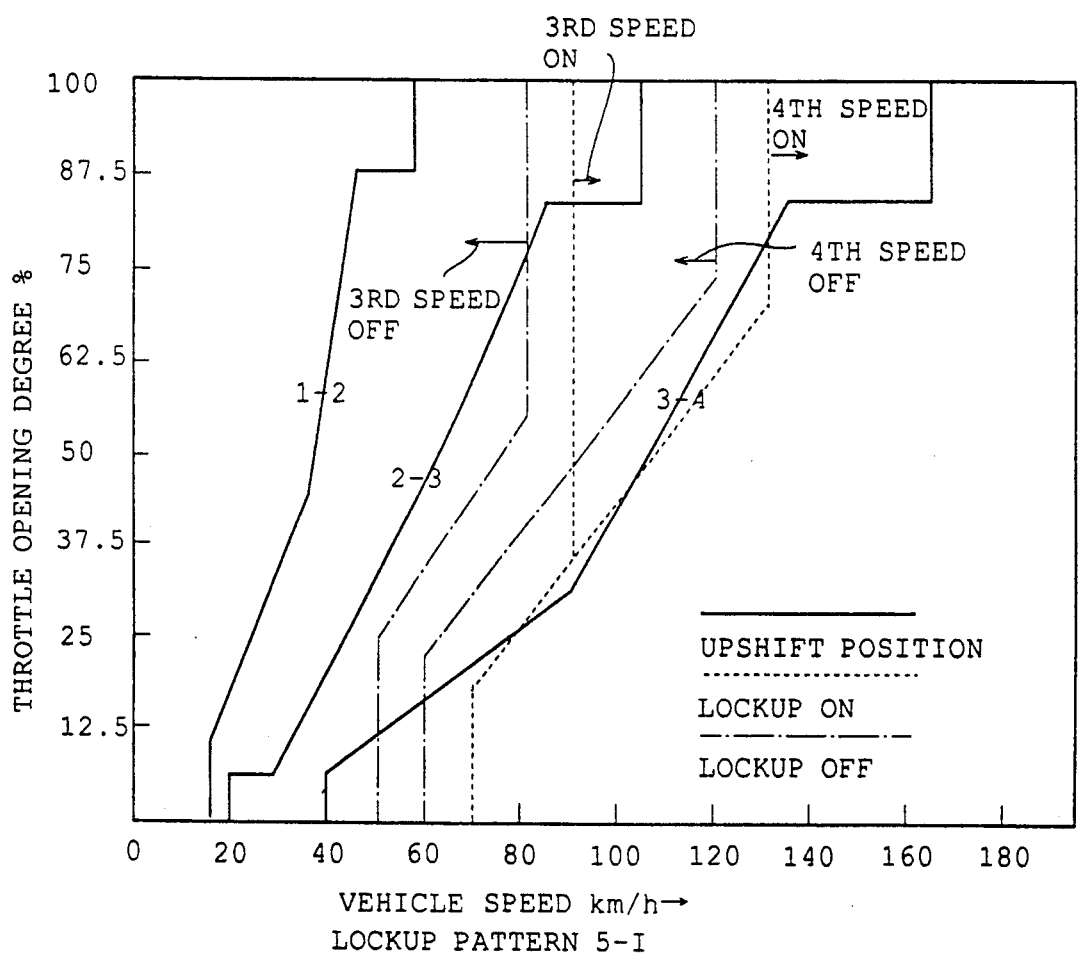
FIGS. 10a and 10b are graphs showing the lockup patterns of the fifth embodiment.
Figure 10:
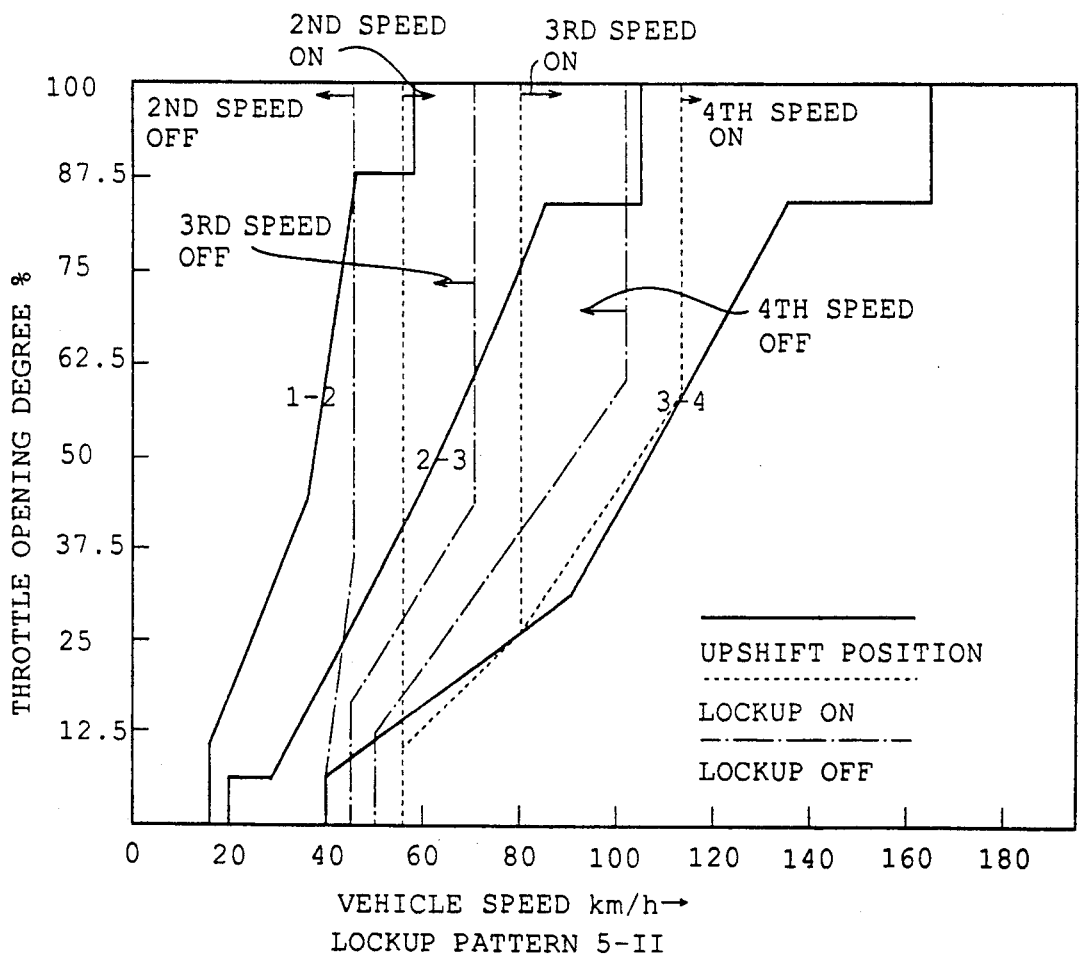

FIGS. 9, 10a and 10b show the fifth embodiment, in which the lockup pattern is determined based on the vehicle speed and the gear ratio.

When A<AS, a lockup pattern 5-I shown in FIG. 10a is selected at a step S43 for operating the lockup clutch LC at the third and fourth speeds at 70 km/h or more. When A>AS, a lockup pattern 5-II shown in FIG. 10b is selected at a step S44. The lockup clutch LC is operated at a speed more than the second speed and at 55 km/h or more.

FIG. 11 shows an operation of the sixth embodiment, in which the throttle opening speed $\alpha$ calculated in the calculator 34 is used as a parameter.

Figure 3:
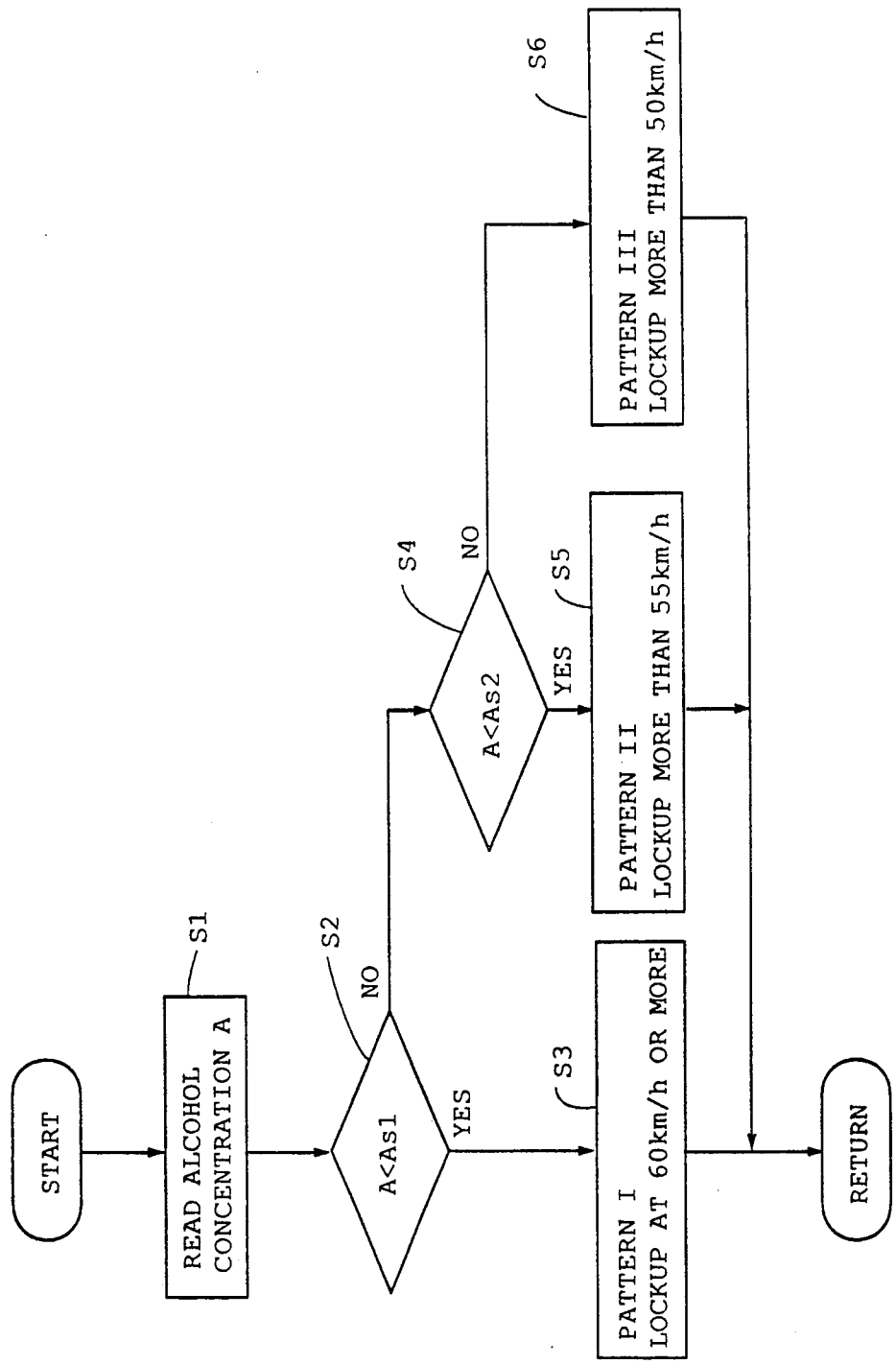
FIG. 3 a flowchart showing an operation of the control unit.

Similar to the first embodiment of FIG. 3, the alcohol concentration A is compared with first and second set values As1 and As2 at steps S2 and S4. When A<As1, a lockup pattern 6-I is selected at a step S53, in which the torque converter LC is locked up when the throttle opening speed $\alpha$ is within a set value $\alpha 1$. When A<As2, a lockup pattern 6-II is selected at a step S55, wherein the torque converter 1 is locked up when the throttle opening speed $\alpha$ is within a set value $\alpha 2$. When A>As2, a lockup pattern 6-III is selected at a step S56, where the torque converter 1 is locked up when the throttle opening speed $\alpha$ is within a set value $\alpha 3$. The set values are $\alpha 1 < \alpha 2 < \alpha 3$.

Thus, even if the throttle opening speed increases at the high alcohol concentration, the lockup operation can be performed.

As aforementioned, the lockup providing section 32 is applied with the oil temperature signal of the torque converter 1 from the sensor 28 for determining the control signal. Thus, when the oil temperature is high, the section 32 operates to expand the range of the vehicle speed for operating the lockup clutch LC.

In accordance with the present invention, the lockup operation for the torque converter is controlled based on a lockup pattern selected in dependency on the concentration of the alcohol in the fuel. When the lockup pattern for the high alcohol concentration is selected for operating the lockup clutch at the low vehicle speed, the power of the engine can be effectively transmitted to the transmission while the engine speed is low, so that the engine is quiet, thereby improving fuel consumption.

The driver can stably drive the vehicle without feeling the change of the engine performance caused by the difference of the alcohol concentration.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In an automatic transmission system for a motor vehicle having an alcohol engine using fuel mixed with alcohol and gasoline, a fuel tank with a fuel pump for supplying the fuel from the fuel tank to the engine through a fuel passage, an automatic transmission having a lockup clutch for a torque converter with driving means for engaging the lockup clutch, and a vehicle speed sensor for detecting speed of the motor vehicle and for producing a vehicle speed signal, the improvement of the system which comprises:
   an alcohol concentration sensor provided on the fuel passage between the fuel pump and the engine for sensing concentration of the alcohol in the fuel and for producing an alcohol concentration signal;
   lockup pattern determining means providing a plurality of lockup patterns and responsive to said alcohol concentration signal for selecting one of said plurality of lockup patterns and for producing a selected lockup pattern signal; and
   lockup means responsive to the vehicle speed signal and said selected lockup pattern signal for operating the driving means to engage the lockup clutch in accordance with a selected lockup pattern so as to improve fuel consumption and stable driving conditions of the vehicle.

2. The system according to claim 1, further comprising:
   comparator means responsive to said alcohol concentration signal for comparing the concentration of the alcohol with a predetermined value so as to determine the selected lockup pattern in the lockup pattern determining means.

3. The system according to claim 1, wherein:
   said lockup pattern determining means selects a high alcohol lockup pattern including a lockup vehicle speed value to engage the lockup clutch of the torque converter via said lockup means when the sensed alcohol concentration is higher than a predetermined value and the vehicle speed is higher than said lockup vehicle speed value, the latter being lower than corresponding lockup vehicle speed values included in the other of said lockup patterns, so as to prevent feeling changing engine performance caused by a difference of the alcohol concentration and to improve the fuel consumption.

4. The system according to claim 1, further comprising:
   range providing means for providing a change speed range signal representing a transmission ratio; and
   said lockup means is further responsive to said change speed range signal.

5. The system according to claim 1, wherein
   the lockup pattern determining means is further responsive to temperature of oil in the torque converter for selecting said lockup pattern.

6. The system according to claim 1, further comprising:
   a throttle position sensor for detecting opening degree of a throttle valve of the engine and for producing a throttle opening degree signal; and
   said lockup means is further responsive to said throttle opening degree signal.

7. The system according to claim 6, further comprising:
   a throttle opening speed calculator responsive to said throttle opening degree signal for calculating a throttle opening speed signal; and
   said lockup means is further responsive to said throttle opening speed signal.

* * * * *